L. RUBARTH.
Ant Traps.
No. 140,954. Patented July 15, 1873.
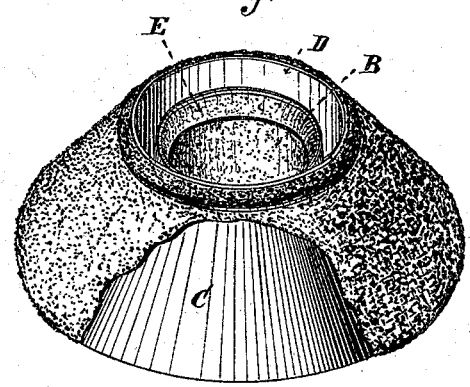
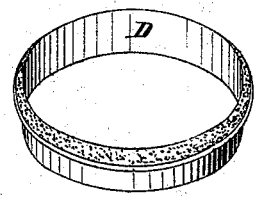
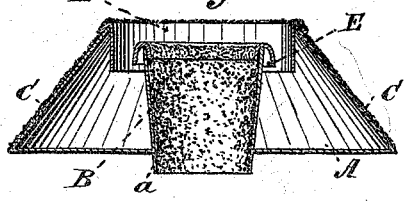

UNITED STATES PATENT OFFICE.

LEANDER RUBARTH, OF DAVILLA, ASSIGNOR OF ONE-HALF HIS RIGHT TO JOHN J. PIKE, OF MILAM COUNTY, TEXAS.

IMPROVEMENT IN ANT-TRAPS.

Specification forming part of Letters Patent No. 140,954, dated July 15, 1873; application filed March 25, 1873.

*To all whom it may concern:*

Be it known that I, LEANDER RUBARTH, of Davilla, in the county of Milam and State of Texas, have invented a new and useful Improvement in Ant-Traps; and I do hereby declare that the following is a full, clear, and exact description of the same, reference being had to the accompanying drawing forming a part of this specification, in which—

Figure 1 is a perspective view of my improved trap. Fig. 2 is a perspective view of one of the glass "overhangs." Fig. 3 is a vertical central section of the trap.

This trap is for catching burrowing insects, but is especially adapted for exterminating a species of large ant which infests portions of the Gulf States, and is very destructive to vegetation. The trap is in the form of a hollow truncated cone, like others of its class, and has a central tube which projects below the bottom, as and for the purpose hereinafter described.

The bottom A is cut out to receive a cylinder or tube, B, which projects slightly downward at *a*, and extends upward to nearly the same height as the body or incline C of the trap. The top of this tube and the cone C are provided with pendent annular flanges or overhangs D E, made of glass, and detachable. The exterior of the cone and the interior of the tube B are sanded or otherwise roughened, to afford an easy foot-hold for the ants. The species of ant I have specially referred to forms a large conical mound of earth around the entrance of the nest, on which this trap may be placed, thus forming a continuation of it, which is sufficiently natural not to alarm the ants and frustrate its purpose; for any very unusual disturbance of the earth about the entrance will cause them to dig out at some other place. The lower end of the tube B penetrates the earth sufficiently to hold the trap in position, and, also, prevent the ants passing beneath the trap; and hence all seeking exit or entrance will pass up by the tube or the incline into the receiving-chamber. Thence they cannot escape, mainly by reason of their proven inability to adhere to the glass overhangs. When the chamber is full the trap may be removed from the nest-mound, and its contents discharged by detaching the overhangs.

Having thus described my invention, what I claim as new, and desire to secure by Letters Patent, is—

In combination with the hollow cone C, the tube B extended below the bottom thereof at *a*, as and for the purpose shown and described.

LEANDER RUBARTH.

Witnesses:
R. S. PORTER,
I. H. COLLINS.